Figure 1:
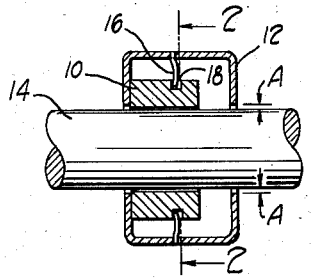

Dec. 13, 1960      E. F. MACKS      2,964,339

SEAL

Filed Jan. 26, 1955      2 Sheets-Sheet 1

INVENTOR.
ELMER FRED MACKS
BY

ATTORNEY

Dec. 13, 1960  E. F. MACKS  2,964,339
SEAL
Filed Jan. 26, 1955  2 Sheets-Sheet 2

INVENTOR.
ELMER FRED MACKS
BY
ATTORNEY

२,964,339
SEAL

Elmer Fred Macks, 22758 Maple Drive, Cleveland, Ohio

Filed Jan. 26, 1955, Ser. No. 484,152

1 Claim. (Cl. 286—10)

This invention relates to seal assemblies and more particularly to seals in which the sealing element is lubricated during operation by the fluid which is being sealed against, the sealing assembly being capable of producing a fluid dynamic gas film between a sealing member and other parts of the assembly which positions the sealing member in a continuously spaced relation with such other parts.

In general, mechanisms having relatively shiftable parts which are subject to sliding contact require a supply of lubricant to such areas that function as load-carrying surfaces to reduce friction and wear. The surfaces are covered with a lubricant such as oil or grease to obtain a film for separating the surfaces. The adequacy of this method of wear prevention is dependent upon a continuous and adequate supply of the lubricant. Further, the lubricant must be maintained in good condition to support the load-carrying surfaces out of sliding contact. Under conditions of speed and extreme heat, the lubricant loses the necessary ability to maintain the film with the result that wear, damage, and eventual destruction occur.

The use of the ambient fluid as the film substance constitutes a solution to the ordinary problems attendant to the use of oils and greases. No question of supply exists when the ambient fluid is used, and even in the case of air or gas, breakdown or loss of lubricating qualities will not result from adverse conditions. The production of an adequate hydrodynamic film of fluid for separating relatively moving surfaces is accomplished by controlling the condition of the surfaces and the distance therebetween during operation. In many applications of this principle, ambient fluid at the necessary conditions is available in the environment without additional supply facilities being required. This results in obvious reductions in original and maintenance costs since the supply of a lubricant continuously or at regular intervals is eliminated.

To obtain a self-supporting sealing member which will function even with air as the supporting medium, a sealing ring may be fitted on a shaft with a small clearance and with means so that any fluid leakage must occur between the sealing ring and the shaft rather than around the sealing ring. Upon relative motion of the sealing ring and the shaft, a fluid dynamic load-supporting film of fluid will be generated between the ring and the shaft which will support the ring out of contact with the cooperating structure. The primary considerations in obtaining a fluid dynamic self-supported seal are the precision of dimensions and the surface finish of the critical confronting surfaces formed on the ring and the shaft. The fluid dynamic region of lubrication is defined by the value of S from the formula:

$$S = \left(\frac{r}{c}\right)^2 \mu \frac{N}{P}$$

The value of S must be great enough to provide that operation of the seal occurs in the fluid dynamic rather than in the boundary region of lubrication. The symbols in the above formula are defined as follows:

$r=$shaft radius, inches.
$c=$radial clearance between shaft and seal ring, inches.
$\mu=$absolute viscosity of fluid dynamic film between seal ring and shaft, lb.-sec./in.$^2$.
$N=$shaft speed, rev./sec.
$P=$unit load acting on seal ring, lb./sq. in.

Minimum values of S defining the fluid dynamic region of lubrication are dependent upon the precision of dimensions and the condition of the surfaces together with other interrelated variables. For example, the value of S defining fluid dynamic lubrication is much less for a finely finished shaft than for a roughly finished shaft. In this regard, critical values of S below 0.001 have been found with superfinished surfaces whereas values over 0.2 occur with surfaces which are rough ground. With commercially available finishing methods, fluid dynamic air films (which will hereinafter be referred to as pneumodynamic films) have been developed with ambient air which support loads of well over one pound per square inch. Seal rings can be readily formed of ordinary materials which weigh less than one twentieth of a pound per square inch of projected area. Seal rings have been designed which will function using a pneumodynamic air film as the lubricating medium.

The seal assembly using a seal ring pneumodynamically supported on a shaft can be built with extremely small clearances between the running surfaces. The leakage may be kept to extremely low values even when sealing air because the leakage is directly proportional to the clearance raised to the third power. In existing non-contact seals, the minimum clearance is approximately a few thousandths of an inch per inch of shaft diameter which cannot be reduced even though the best quality of workmanship is used. The foregoing relatively large values of clearance must be used so that contact will not be made due to shaft misalinements and deflections and bearing clearances. In the pneumodynamic seal, the clearance may be maintained at a value of a few ten thousandths of an inch and the running surfaces will not come in contact even though the shaft may be out of line and shaft deflections occur. Shaft whip or change in radial position of the shaft for other reasons will not cause seal contact. The foregoing is so since the seal ring inherently supports itself out of contact with the shaft while being free to follow shaft movements. In comparing leakage rates of different seals, the clearance ratio cubed indicates that a clearance ratio of one to ten may be achieved by the improved seal over the presently available non-contact seal and that the leakage therethrough would be in the ratio of one to one over a thousand. Since the assembly is self-adjusting and self-regulating, the continuous operation of the sealing member in spaced relation with the adjacent structure is assured and no wear occurs which would increase the leakage area.

Accordingly, one of the objects of this invention is to provide a sealing member capable of forming a fluid film between the member and associated structure.

Another object of this invention is to provide a seal assembly which has a sealing member having an inner surface confronting a moving surface, the distance between such surfaces being such that a pneumodynamic load-supporting film is developed by relative movement between the surfaces.

Another object of this invention is to provide a seal assembly that will function with any ambient fluid being sealed against, the fluid being used as the lubricating medium to prevent contact and wear between relatively moving surfaces even though the fluid may be air or a gas.

A still further object of this invention is to provide a seal that is supported by the shaft with which it cooperates, the seal functioning in spaced relation to the shaft although deflections and misalinements of the shaft occur.

A still further object of this invention is to provide a simple seal assembly which is capable of functioning over extremely wide temperature ranges and wide speed ranges with fluids of varying viscosities.

Other objects and advantages, more or less ancillary to the foregoing, and the manner in which all the various objects are realized will appear in the following description, which, considered in connection with the accompanying drawings, sets forth the preferred embodiment of the invention.

Figure 2:
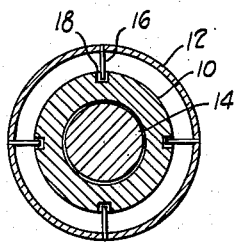
Figure 3:
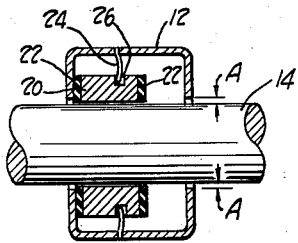
Figure 4:
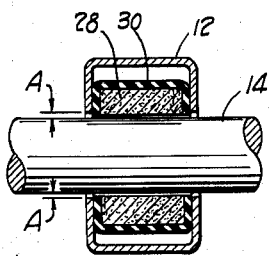
Figure 5:
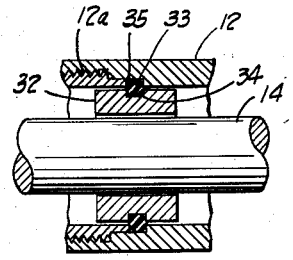
Figure 6:
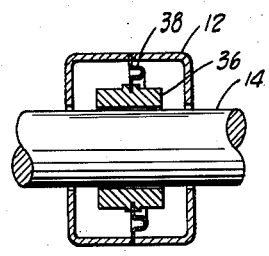
Figure 7:
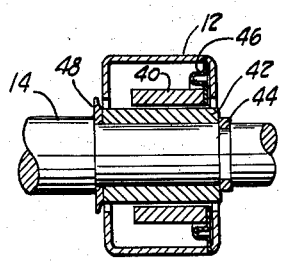
Figure 8:
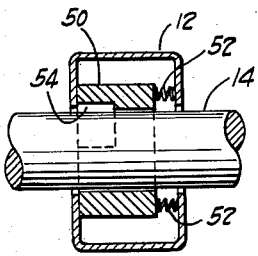
Figure 9:
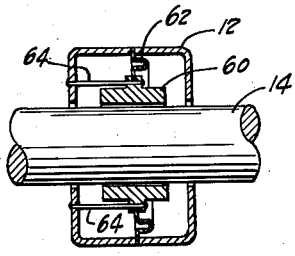
Figure 10:
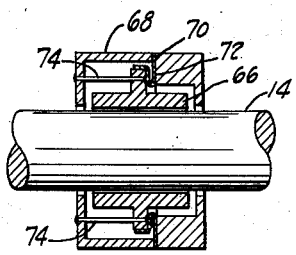
Figure 11:
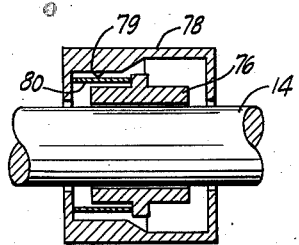
Figure 12:
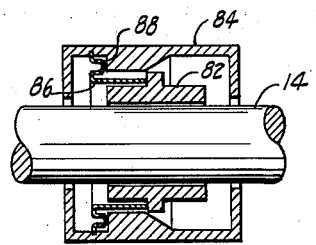
Figure 13:
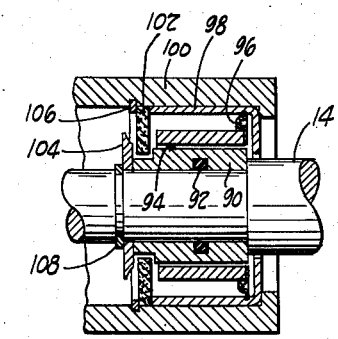
Figure 14:
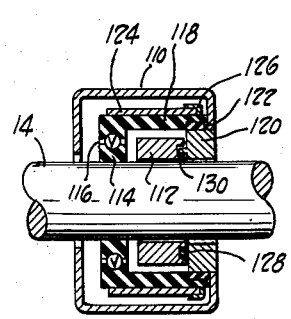
Figure 15:
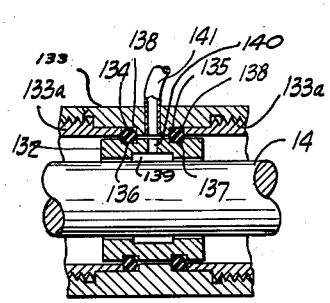
Figure 16:
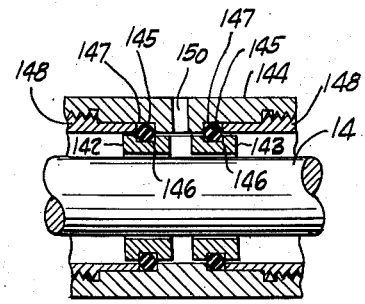
Figure 17:
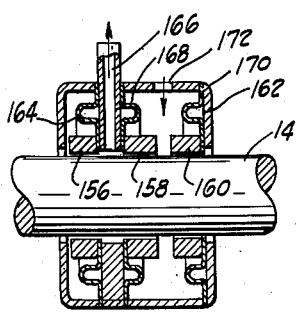
Figure 18:
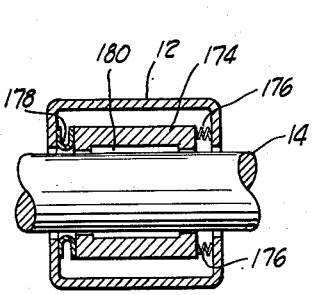

In the drawings:

Fig. 1 is a sectional view of a seal assembly;
Fig. 2 is a sectional view taken along line 2—2 of Fig. 1;
Fig. 3 is a sectional view of a shaft seal;
Fig. 4 is a sectional view of a shaft seal;
Fig. 5 is a sectional view of a shaft seal;
Fig. 6 is a sectional view of a shaft seal;
Fig. 7 is a sectional view of a shaft seal;
Fig. 8 is a sectional view of a shaft seal;
Fig. 9 is a sectional view of a shaft seal;
Fig. 10 is a sectional view of a shaft seal;
Fig. 11 is a sectional view of a seal assembly;
Fig. 12 is a sectional view of a seal assembly;
Fig. 13 is a sectional view of a cartridge-type seal assembly;
Fig. 14 is a sectional view of a seal assembly;
Fig. 15 is a sectional view of a shaft seal;
Fig. 16 is a sectional view of a shaft seal;
Fig. 17 is a sectional view of a shaft seal assembly; and
Fig. 18 is a sectional view of a shaft seal assembly.

In Fig. 1, a seal assembly is shown which includes a ring 10 formed from any machinable material such as steel. The ring 10 is located within a housing 12 which may be stationary and a part of a machine frame. Ring 10 circumscribes a shaft 14 and a very small clearance is provided between the inner face of the ring 10 and the shaft 14 so that the shaft 14 may run free of the ring 10. The diametral clearance will generally be in the range of 0.0001 to 0.001 inch per inch of a shaft diameter but may be somewhat smaller or larger as determined by the surface finish or the viscosity of the fluid respectively. In general, the clearance will be less as the viscosity of the fluid to be sealed against decreases.

The proximity of the inner wall of the ring 10 to the shaft 14 allows the production of a pneumodynamic film of fluid which maintains the spacing of the ring 10 relative to the shaft 14. The fluid used in the film is the ambient fluid being sealed against. The seal is particularly adapted for operation with air since slight leakage of air generally is not objectionable. Shaft and rod seals such as found in air compressors or turbines are particularly suitable to the use of this type of seal which may utilize the air being handled by the machine to obtain the lubricating film for the seal assembly.

As shown in Fig. 1, the seal would be urged toward one wall of the housing 12 by a spring 16 affixed to the housing 12 and having the free end engaged with a recess 18 formed in the outer wall of the ring 10. The spring 16 further operates to prevent rotation of the ring 10 which might occur upon initial operation of the shaft 14. The clearance in the recess 18 is sufficient to allow radial movement of the ring 10 as required for accommodating misalinement and deflections in the assembly. Since the seal is in engagement with one wall of the housing 12, the primary leakage is limited to the space between the ring 10 and the shaft 14. This leakage is extremely small since the cross-sectional area of the leakage path is small and the flow is further reduced by the proximity of the walls and the boundary-layer effect. It is noted that the lack of radial confinement of the ring 10 allows radial freedom of the ring 10 which provides the necessary freedom for the ring 10 to be supported by and located in its operative position by the shaft 14. More than one spring 16 may be used so as to provide uniform circumferential face pressure between the real ring face and the housing flange.

The pneumodynamic-film pressure available for the supporting and positioning of the ring is directly related to the viscosity of the film and the shaft speed relative to the ring. Obviously, if a fluid of higher viscosity than air, such as water, is used in the pneumodynamic film, the strength of the film in supporting the ring 10 is greatly enhanced. Since the ring 10 is supported and positioned by the pneumodynamic film, the seal assembly is selfregulating and running clearance between the shaft 14 and the ring 10 is maintained at all times. Since there is no contact, no wear or deterioration of the ring 10 results from continued relative movement between the ring 10 and the shaft 14.

The higher pressure may act on either the left or right seal ring face depending upon desired operating conditions. For example, when the pressure to be sealed against is small and ailnement is not a problem, it would be preferred to have the high pressure act on the right seal face so as to aid spring 16 in urging the seal ring 10 to contact the housing over its entire left face. However, when the pressure to be sealed against is great and misalinement is a problem, the high pressure should act on the left seal face and the force of spring 16 should be great enough to hold the seal in contact over its left face. If distance A is kept as small as possible consistent with alinement requirements, the pressure force acting to force the ring 10 away from the left face contact with the housing 12 will be small even over a wide sealing pressure range. This will allow the seal unit to function effectively over a wide pressure range and with a minimum force between the seal ring face and the housing 12 so as to allow greater radial freedom of the seal ring 10 to accommodate shaft movement.

When a sealing ring 10 is used with a horizontal shaft, the ring 10 would be slightly eccentric relative to the shaft 14 as shown in Fig. 2, due to the effect of gravity operating on the ring 10. However, the ring 10 would position itself essentially concentric to a vertical shaft since the only forces acting on the ring in a radial direction would be those of the lubricating film be it gaseous or liquid.

In Fig. 3 a seal assembly is shown having a ring 20 with its inner wall closely spaced from the shaft 14, a distance sufficient to establish a pneumodynamic film upon rotation of the shaft 14. The sealing ring 20 has resilient material in the form of a coating 22 affixed to one or both ends of the seal ring 20 to provide a better end face sealing at the point where the ring 20 and the coating 22 contacts a housing 12. The coating 22 on the ring 20 further limits the leakage to the area between the ring 20 and the shaft 14. The coating 22 may be a friction reducing material such as a solid-film lubricant, an example of which is bonded $MoS_2$. Such a friction reducing material will permit the seal ring 20 to more easily follow the motion of the shaft 14 with respect to the housing 12 over a greater range of sealing pressures. Here again A is kept small and the higher pressure may act on either the left or right seal ring face, depending upon operating conditions and desired results.

A spring-like finger 24 is affixed to the housing 12 and extends into a recess 26 formed in the outer wall of the ring 20. The finger 24 urges the ring 20 into close contact with the housing 12, thus increasing the sealing effect of the resilient ring 22 while preventing rotation of the ring 20 when the shaft 14 begins to rotate. Since the finger 24 does not extend to the bottom of the recess 26, radial freedom is maintained for the ring 20 to assume an operating position wherein it is supported on the pneumodynamic film rather than being in contact with the shaft 14.

The sealing assembly illustrated in Fig. 4 utilizes a ring 28 formed from a permeable material such as sintered metal which is pervious to the fluid being sealed against. The outer surfaces of the ring 28 are covered by a shell 30 which may be of resilient material. The shell 30 is affixed to a housing 12 at the ends of the ring 28 to hold the ring 28 in its initial position proximate to the operating position and to prevent rotation of the ring 28 when the shaft 14 commences operation. The resilience of the shell 30 allows the ring 28 to assume the operating position supported on the pneumodynamic film produced by rotation of the shaft 14. The sealing ring 28 shown in Fig. 4 is particularly adapted to prevent vibration or chattering during operation. As the pressure in the film fluctuates which would be the situation in the event of vibration, the fluid under high pressure would tend to flow circumferentially in the ring 28 and when a condition of low pressure existed, the fluid would flow out of the ring 28. This condition of circumferential flow from the film in and out of the ring 28 provides the self-dampening characteristic which tends to stabilize the operation of the seal assembly. The distance A is kept as small as possible consistent with alinement requirements so as to minimize any tendency of the seal ring to cock or skew due to differential exposed circumferential end area.

In Fig. 5, a sealing assembly is shown having a ring 32 disposed within a housing 12 with its inner wall closely spaced from a shaft 14, a distance which allows the pneumodynamic film to form upon rotation of the shaft 14. A seal ring 32 is supported by a resilient O-ring 33 which is located in groove 34 formed in the outer wall of seal ring 32 approximately at the longitudinal center thereof. A groove 35 in the housing 12 confronts groove 34 for receiving the outer periphery of the ring 33. A portion 12a of the housing 12 is removably affixed thereto by threads or bolts as required to provide for assembling the seal ring in the housing 12. The portion 12a is first removed to allow the O-ring to be moved into operating position whereupon the portion 12a is replaced, thus completing the groove 35. It is noted that the O-ring 33 resiliently supports the sealing ring 32 in spaced relation with the shaft 14 and seals against leakage of the fluid between the outer surface of the seal ring 32 and the housing 12. The location of the O-ring 33 at the longitudinal center of the ring 32 allows the ring 32 to position itself even though the shaft 14 may be skewed relative to the housing 12. Unnecessary loading of the ring 32 is eliminated which would otherwise prevent the ring 32 from positioning itself in spaced relation with the shaft 14 during rotation thereof.

The seal assembly shown in Fig. 6 includes a seal ring 36 of the type shown in Fig. 1 which surrounds a shaft 14 and is located within a housing 12. A diaphragm 38 is affixed to the housing 12 at its outer periphery and is joined in sealed engagement with the ring 36. Diaphragm 38 positively prevents leakage around the ring 36 while allowing the ring 36 to tilt or be displaced radially as required to maintain clearance as it operates free of the shaft 14. In the preferred embodiment a diaphragm 38 is shown but it is understood that other resilient means capable of preventing leakage around the ring while allowing the necessary freedom of movement of the ring 36 are contemplated.

In Fig. 7 the seal assembly has a ring 40 in spaced relation with a bushing 42 which is mounted on a shaft 14 and held in operating position by a snap ring 44. The bushing 42 has an outer diameter corresponding to a dimension slightly less than the inner diameter of the ring 40. The ring 40 is joined to a housing 12 by a diaphragm 46 which prevents leakage around the outside of the ring 40 while allowing radial freedom for movement of the ring 40. A dirt slinger 48 is provided at the flow entrance to the housing 12 to remove particles of foreign material from the fluid entering the housing 12 which would interfere with the operation of the seal ring 40 if an accumulation of dirt were to be forced into the space between the ring 40 and the bushing 42. The provision of the cartridge-type seal assembly has advantages of manufacture since the manufacture of the bushing 42 and the ring 40 can be made under conditions which will make possible fine finishes and close tolerances of dimension which could not necessarily be obtained if the application were made directly to the outer wall of a shaft.

A sealing assembly as shown in Fig. 8 utilizes a sealing ring 50 surrounding the shaft 14 in spaced relation thereto. The ring 50 is located within a housing 12 which surrounds the shaft 14. The ring 50 has one end thereof held in abutting relationship with the housing 12 by spring means 52 which urges the ring 50 towards the high pressure end of the housing 12. At the high pressure end of the ring 50, a recess 54 is formed in the inner wall of the ring 50 in the upper half of the inner periphery of the ring 50 as it is disposed in its operating position. The recess 54 in the ring 50 extends through a portion of the length thereof required to eliminate contact between the seal ring and the shaft for the operating conditions imposed and may have a depth of 0.0001 inch. The provision of the recess 54 above the shaft 14 allows the seal ring 50 to float pneumodynamically over a wider sealing pressure range since the escaping fluid may act around the entire circumference of the seal ring 50 for the length of the recess 54. This feature causes forces to act to support the seal ring 50 so that it will not be forced down on the shaft 14 by such escaping fluid at the point of maximum film thickness before the shaft rotation and before the hydrodynamic film is formed. A friction reducing material may be applied to the end of the seal ring 50 abutting the housing 12 to reduce the load on the pneumodynamic film in positioning the ring 50 as required by shaft misalinement.

The depth of the recess 54 may be greater than 0.0003 inch per inch of seal-ring diameter under certain operating conditions. Also the top relief may include the entire wall thickness in order to have a larger sealing area on the lower half of the ring than on the upper half which supports the ring under all conditions as set forth above.

The sealing-ring assembly illustrated in Fig. 9 includes a ring 60 circumscribing a shaft 14 and being spaced therefrom during relative rotation. The ring 60 is disposed within a housing 12 which carries a diaphragm 62 affixed thereto at the outer periphery of the diaphragm 62 and affixed to the ring 60 at the inner periphery of the diaphragm 62. The diaphragm 62 is joined at the central position on the ring 60 to balance the forces tending to cause misalinement of the ring 60 with the shaft 14. The plurality of tension members 64 are disposed around the ring 60 and are affixed to the housing 12 and the ring 60 with the purpose of restraining the ring 60 against movement which would be caused by the pressure difference across the ring. The member 64 may take the form of wire, chains, or similar devices which would prevent movement axially of the shaft 14 that would not restrain the ring 60 against movement in a radial direction. In this manner the ring 60 is held in operating position while being allowed to shift radially as required to maintain the spaced relation with the shaft 14 as determined by the pneumodynamic film of fluid between the ring 60 and the shaft 14.

In Fig. 10, the ring 66 is supported on a pneumodynamic film between the ring 66 and the shaft 14. The housing 68 surrounds the ring 66 and the shaft 14 and carries a diaphragm 70 which is sealed and affixed to the housing 68 and is also affixed to a central portion of the ring 66.

The radial portion of the diaphragm 70 is supported on a shoulder 72 formed on the housing 68 which supports the diaphragm 70 and allows the seal to be operated under higher pressure conditions. A plurality of wires 74 are disposed between the housing 68 and the ring 66 and are affixed to each respectively. The wires 74 function to carry the load imposed on the ring 66 in an axial direction by the pressure differential across the seal. The wires 74 may be any type of flexible tension material since it is desired to maintain the position of the ring 66 while allowing the hydrodynamic film to carry the ring 66 relative to the shaft 14 and maintain constant clearance therebetween.

The seal assembly illustrated in Fig. 11 has a ring 76 located within a housing 78 and circumscribing a shaft 14 in spaced relation thereto and supported out of contact therewith during operation by the pneumondynamic film generated from the fluid being sealed against. The ring 76 is joined to the housing 78 by a thin flexible sleeve 80 which serves to restrain the ring 76 against axial movement and to prevent leakage of fluid around the outside of the ring 76. The sleeve 80 allows small radial movement of the ring 76 during operation as required by misalinement of fluctuations in the shaft 14. Excessive displacement of sleeve 80 is prevented by shoulder 79.

In Fig. 12, the seal ring 82 is disposed within a housing 84 and around a shaft 14 in spaced relation thereto. A diaphragm 86 is joined to the housing 84 and to the central portion of the ring 82 to prevent leakage around the outside of the ring 82 and to position the ring 82 during operation. The pressure drop across the ring 82 tends to displace the ring 82 axially which is prevented by the axial tension in the diaphragm 86. A shoulder 88 formed on the housing 84 provides an abutment for strengthening the diaphragm 86 in a direction opposite to the force applied by the fluid under pressure.

A seal assembly may be provided in cartridge form wherein the elements are preadjusted. This construction is illustrated in Fig. 13 as having a bushing 90 mounted on a shaft 14, with an O-ring seal 92 therebetween to prevent leakage along the shaft 14. The provision of the seal 92 eliminates the need for close fits between the shaft 14 and the bushing 90. A ring 94 is formed with its inner wall accurately sized to allow a clear space between the ring 94 and the bushing 90. The ring 94 is attached to a flexible diaphragm 96 which seals against leakage around the outside of the ring 94. The flexible diaphragm 96 allows the ring 94 to shift radially relative to the bushing 90. This renders the seal selfadjusting since the pneumodynamic film between the ring 94 and the bushing 90 has sufficient strength to position the ring 94 and distort the flexible diaphragm 96 as required to maintain the clearance between the ring 94 and the bushing 90. The flexible diaphragm 96 is held by a cage 98 which fits the inner wall of the seal housing 100. The cage 98 also supports a ring 102 of filter material which absorbs dirt or other foreign material which would tend to lodge in the clearance space between the ring 94 and the bushing 90. A second ring 104 is carried by the bushing 90 and tends to sling the dirt or foreign material to the outer wall of the housing 100, thus assisting in preventing the entrance of foreign matter to the seal assembly. The cage 98 is held in assembled relation with the seal housing 100 by a snap ring 106 and the bushing 90 is held in position by a snap ring 108 engaged with the shaft 14. The preassembled cartridge-type seal assembly may be installed and placed in operation by merely adjusting the snap rings 106 and 108. No adjustments to the seal itself are required.

To obtain positive sealing at static conditions while retaining the advantages of the self adjusting seal ring when motion is involved, an auxiliary valving is provided as shown in Fig. 14. A housing 110 retains a seal ring 112 in spaced sealing position relative to the shaft 14.

A ring 114 is affixed to the shaft 14 and carries a circumferential pivot 116 which opens upon pivotal movement in the assembly. A resilient sleeve 118 is carried by the pivot 116 and has a diameter greater than the outer diameter of the ring 112. The end of the sleeve 118 opposite the pivot 116 overlies a shoulder 120 on the housing 110. A soft gasket 122 lies between the sleeve 118 and the shoulder 120 to effect a fluid-tight seal therebetween. A series of weights 124 is affixed to the outer wall of the sleeve 118 and spaced circumferentially therearound. Upon rotation of the shaft 14, the sleeve 118 is rotated and the weights 124 pull the sleeve 118 away from the shoulder 120, thus allowing fluid to enter the space around the sealing ring 112 which produces the pneumodynamic lubricating film between the ring 112 and the shaft 14. As long as the shaft 14 continues to rotate, the sleeve 118 will remain in the expanded condition, thus eliminating rubbing and wear. Under this condition, the sealing against leakage of the fluid from the housing would be accomplished by the sealing ring 112 which floats relative to the shaft 14 without physical contact therewith. When motion in the shaft 14 ceases, the sleeve 118 contracts and bears against the gasket 122 and the shoulder 120. Therefore, as long as the shaft 14 remains motionless, there is no possibility of leakage through the seal since deterioration cannot occur in the auxiliary sealing assembly during operation. A circumferential ring 126 of rigid material circumscribes the sleeve 118 and limits the expansion of the sleeve 118 to a safe amount. An abutment 128 formed on the housing 110 engages a recess 130 in the ring 112 with clearance for radial shifting of the ring 112. The abutment 128 prevents rotation of the ring 112.

In Fig. 15, a series-type seal is illustrated wherein a ring 132 is disposed within a housing 133 in circumferential relationship with a shaft 14. A pair of spaced O-rings 134 and 135 are disposed in grooves 136 and 137 formed in the outer wall of the ring 132. A pair of grooves 138 in the inner wall of the housing 133 confront the grooves 136 and 137 and receive the outer periphery of the O-rings 134 and 135. Portions 133a of the housing 133 are removable to allow the assembly of the sealing ring 132 with the housing 133. Portions 133a may be removed and the O-rings inserted in place and then the portions 133a returned to their operating position to hold the O-rings. The ring 132 has spaced operative sections with a circumferential groove 139 therebetween. The groove 139 is connected through a passage 140 in the ring 132 and a passage 141 in the housing 133 to the exterior thereof. Fluid may flow into or out of the groove 139 depending upon the desired operating condition. Air or other fluid under pressure may be introduced through passage 141 and passage 140 into groove 139 and thus leakage may be restricted to the secondary fluid introduced through the passage 141 rather than having primary fluid leakage between the seal ring 132 and the shaft 14. This arrangement is of value where the primary fluid is toxic or valuable. An exact pressure balance is required in groove 139 and the high pressure being sealed against if it is desired to prevent mixing of fluids in the high pressure region or in the groove 139. It is noted that the O-rings 134 and 135 have sufficient radial flexibility to allow positioning of the ring 132 by the pneumodynamic film formed between the ring 132 and the shaft 14. Further, the O-rings 134 and 135 prevent leakage around the outer surface of the ring 132 by the fluid being sealed against. The spaced O-rings 134 and 135 establish an annular passage between the housing 133 and the ring 132 for carrying fluid from passage 141 to 140 as required by the operation of the device.

In Fig. 16, a series-type seal is shown having a pair of sealing rings 142 and 143 disposed in spaced relation with the shaft 14 and located within a housing 144. Each ring 142 and 143 is provided with an O-ring 145 carried by a groove 146 in each of the rings 142 and 143 respectively. A similar groove 147 for each of the O-rings 145 is provided in the housing 144 confronting the grooves 146 for receiving the peripheral portion of the O-rings 145. Removable portions 148 of the housing 144 allow the assembly of the sealing rings 142 and 143 since the O-rings 145 are confined in a pair of confronting grooves 146 and 147. Portions 148 may be removed to allow the insertion of the O-rings 145 whereupon they are replaced and affixed in the operating position. The O-rings 145 provide a seal for preventing leakage around the outer surface of the sealing rings 142 and 143. Further, the resiliency of the O-rings 145 allow radial motion in the rings 142 and 143 as required for maintaining clearance between the shaft 14 and sealing rings 142 and 143 by the hydrodynamic film. As pointed out above in describing the sealing assembly shown in Fig. 5, the rings 142 and 143 are supported near the longitudinal center which allows unrestricted adjustability for accommodating misalinement of the shaft 14 with the housing 144. Passage 150 is formed in the housing 144 to allow fluid to flow into or out of the space between the rings 142 and 143. The venting of fluid from the space between the rings 142 and 143 or the supply of fluid under pressure depends upon the desired operating conditions.

In Fig. 17, a seal assembly is illustrated having three sealing rings 156, 158, and 160 disposed in spaced relation with the shaft 14 and located within a housing 162. The ring 156 is joined to the housing 162 by a diaphragm 164 which prevents leakage therearound and holds the ring 156 against rotation. The ring 156 is at the high pressure end of the seal and a diaphragm 164 abuts against a conduit 166 provided for venting the fluid to a collection chamber which escapes through the space between the ring 156 and the shaft 14. A second ring 158 is connected to the housing 162 by a diaphragm 168 which is disposed in an abutting relationship with a conduit 166 for withstanding pressure in a direction opposite to the diaphragm 164. A third ring 160 is connected to the housing 162 by a diaphragm 170 which seals against leakage around the ring 160 and prevents rotation thereof. A port 172 in the housing 162 is provided for introducing air or other fluid under pressure into the space between the rings 158 and 160. In this manner, any leakage from the seal assembly is restricted to the fluid which is introduced through the port 172 rather than the fluid which would leak through the space between the ring 156 and the shaft 14. This seal has particular value where valuable or poisonous fluids were being sealed against and a nontoxic or less valuable fluid could be introduced through the port 172. This seal prevents fluid mixing in the high pressure region under such conditions.

The seal assembly shown in Fig. 18 includes a sealing ring 174 surrounding a shaft 14 and spaced therefrom during operation. A housing 12 surrounds the shaft 14 and the ring 174. The ring 174 is urged toward the high pressure end of the housing 12 by a spring means 176 between the end of the ring 174 and the housing 12. At the opposite end of the ring 174, a circular channel 178 of a deformable material which will allow adjustment to provide alinement of the ring 174 as required to obtain concentricity of the ring 174 with the shaft 14. The inner diameter of the channel 178 is closed and located proximate to the shaft 14, thus reducing the area to a minimum over which the high pressure fluid operates on the end of the ring 174. This further reduces the strength of the spring 176 required to balance the pressure forces which renders the springs 176 effective over a wide sealing pressure range. A recess 180 is formed on the inner wall of the ring 174 throughout the circumference thereof and has a depth in the order of 0.0001 to 0.001 inch per inch of seal-ring diameter which is sufficient to allow the ring to float pneumodynamically over a wide sealing pressure range. This recess 180 prevents the escaping fluid from forcing the ring 174 down on the shaft 14 before shaft rotation has begun and the hydroynamic film is formed. Accordingly, the seal ring 174 will float pneumodynamically over a wider sealing pressure range by virtue of the initial action of the balancing of pressures around the shaft 14 and within the ring 174. The provision of friction reducing coating material between the channel 178 and the ring 174 would reduce the load on the pneumodynamic film during alinement action and this coating material may take the form of $MoS_2$ or other solid friction reducing material providing the same operating characteristics.

Although the foregoing description is necessarily of a detailed character, in order that the invention may be completely set forth, it is to be understood that the specific terminology is not intended to be restrictive or confining; and that various rearrangements of parts and modifications of design may be resorted to without departing from the scope or spirit of the invention as herein claimed.

What is claimed is:

A seal assembly for a shaft and a housing therearound comprising a cage, a bushing on said shaft within said cage, said cage being releasably mounted in said housing, and said bushing being releasably mounted on said shaft, a sleeve having its inner wall confronting said bushing and spaced therefrom, said bushing having a smooth cylindrically contoured external surface, said sleeve inner wall being a smooth cylindrically contoured surface complemental to said bushing surface and generally coaxial therewith, said surfaces having a diametral clearance not in excess of about 0.001 inch per inch of shaft diameter and flexible diaphragm means intermediate said cage and said sleeve, said flexible means preventing leakage between said sleeve and said cage and restraining said sleeve against rotation.

References Cited in the file of this patent

UNITED STATES PATENTS

| | | |
|---|---|---|
| 846,747 | Kerr | Mar. 12, 1907 |
| 1,980,081 | Ovington | Nov. 6, 1934 |
| 2,009,154 | Waseige | July 23, 1935 |
| 2,080,403 | Homan | May 18, 1937 |
| 2,259,620 | Couch | Oct. 21, 1941 |
| 2,385,388 | Thoresen | Sept. 25, 1945 |
| 2,420,557 | Mueller | May 13, 1947 |
| 2,432,694 | Snyder | Dec. 16, 1947 |
| 2,462,901 | Robison | Mar. 1, 1949 |
| 2,473,139 | Dickerman | June 14, 1949 |
| 2,554,234 | Baudry et al. | May 22, 1952 |
| 2,650,116 | Cuny | Aug. 22, 1953 |
| 2,698,584 | Stelzer | Jan. 4, 1955 |